United States Patent [19]

Daberkow

[11] Patent Number: 4,541,767

[45] Date of Patent: Sep. 17, 1985

[54] PIPE LOADER

[76] Inventor: Donald L. Daberkow, Rte. 3, Box 284A, Grand Island, Nebr. 68801

[21] Appl. No.: 451,519

[22] Filed: Dec. 20, 1982

[51] Int. Cl.$^4$ .............................................. B60P 1/36
[52] U.S. Cl. .................................... 414/523; 414/745; 414/528
[58] Field of Search ............... 414/505, 523, 528, 745, 414/502–504, 507, 748; 198/312, 313, 317

[56] References Cited

U.S. PATENT DOCUMENTS

| | | | |
|---|---|---|---|
| 1,841,525 | 1/1932 | Evenson | 414/523 |
| 2,574,974 | 11/1951 | Johnson | 414/745 X |
| 2,660,439 | 11/1953 | Scranton | 414/505 X |
| 3,310,154 | 3/1967 | Peterson | 414/745 X |
| 3,458,055 | 7/1969 | Council | 414/748 |
| 3,501,032 | 3/1970 | Cissel, Jr. | 414/523 |
| 3,539,067 | 11/1970 | Secrist et al. | 414/503 X |
| 3,587,885 | 6/1971 | Hanway | 414/745 X |
| 3,667,621 | 6/1972 | Barlow | 414/745 X |
| 4,119,223 | 10/1978 | Fiechter | 414/523 |

Primary Examiner—Robert J. Spar
Assistant Examiner—David A. Bucci
Attorney, Agent, or Firm—Henderson & Sturm

[57] ABSTRACT

A conveyor (10) for use in transferring elongated objects (11) between a vehicle (13) and a location. A powered continuous roller conveyor (20), having carrier blocks (26c) attached to certain of its links, is mounted with one end (21c) adjacent to and slightly above the bed of the vehicle (13) and the other end (21b) extending outwardly to a point slightly above the location and assists an individual who controls a free end of the elongate object in loading and unloading pipe (11) for example. The conveyor may be collapsed alongside the vehicle, raised or lowered, positioned further from or closer to the vehicle, dismounted from the vehicle, or angled more or less with respect to the vehicle bed.

1 Claim, 4 Drawing Figures

FIG. 1

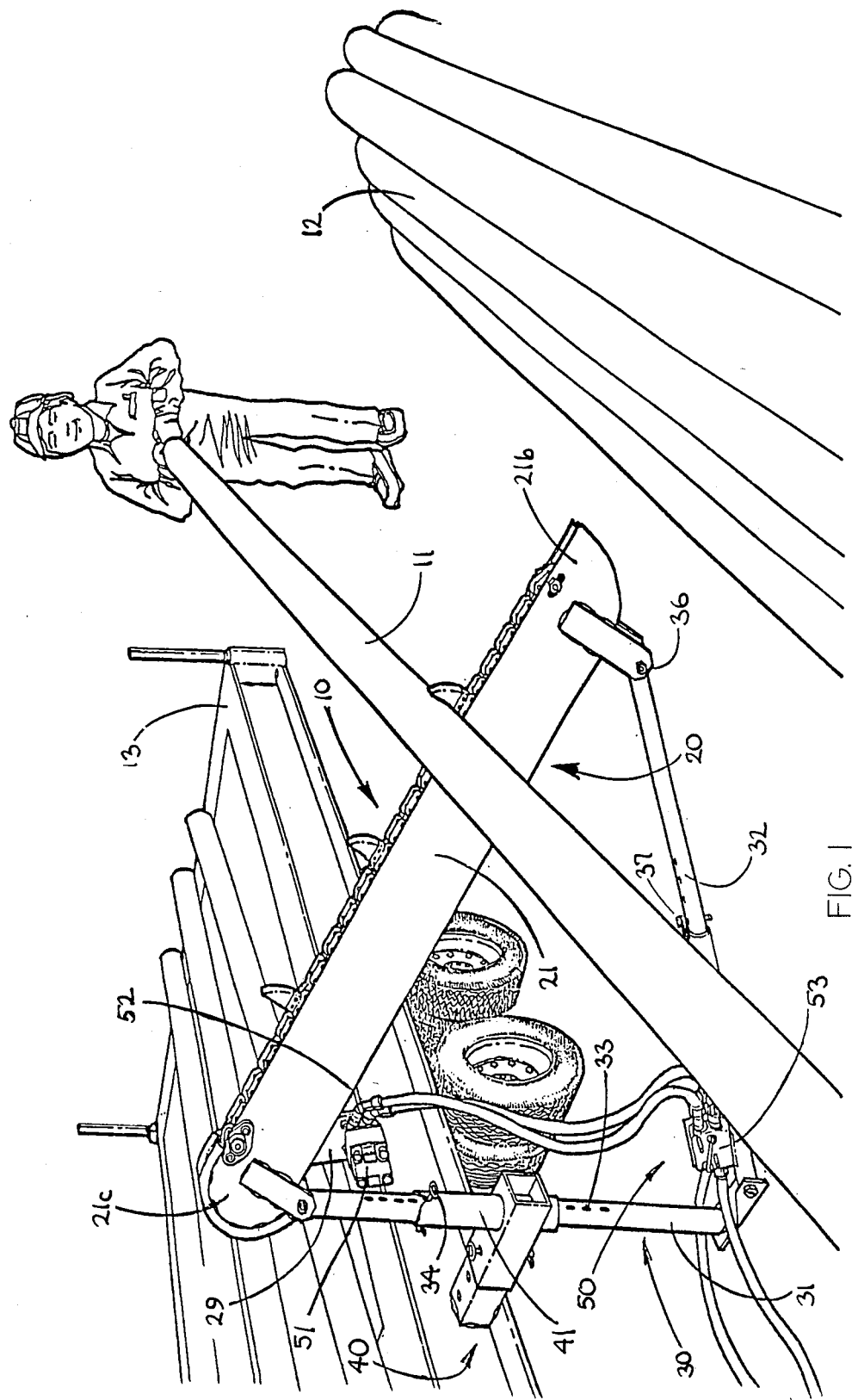

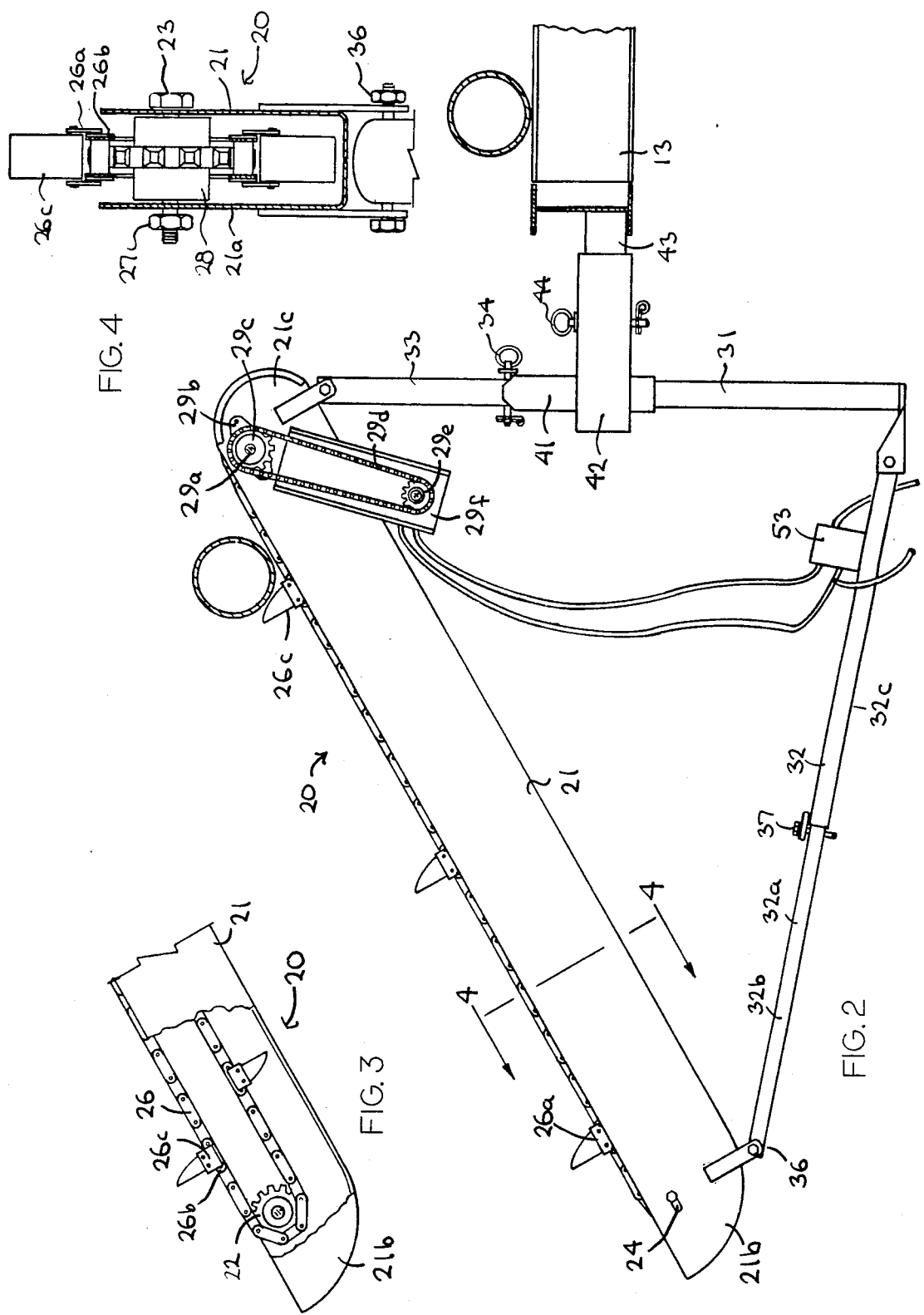

PIPE LOADER

TECHNICAL FIELD

The present invention relates generally to apparatus for loading and unloading elongated objects between a storage or ground position and a transportation vehicle having an exposed side. More particularly, the invention relates to the handling of such objects having circular cross-sections and of a weight such that it is possible for a person to work in conjunction with the apparatus in performing its function, such as lightweight irrigation pipe.

BACKGROUND ART

Ordinarily, irrigation pipe is taken from storage and laid out in the field prior to planting. After harvest the pipe is picked up in the field and returned to a location where it can be repaired and stored safely through the winter months. To accomplish these functions, sections of irrigation pipe are typically loaded lengthwise from storage to a flatbed trailer. Such pipes are usually made of aluminum, or other materials having comparable weight and strength characteristics, in order that it can be substantially the same length as an over-the-road flatbed trailer and yet not too heavy to be lifted onto and off of it by two adults of average strength.

Typically, the depositing and retrieving of irrigation pipe in the field is accomplished by three persons, one driving a trailer-pulling vehicle and the other two following behind to manually load or unload each section of pipe as the trailer moves throughout the field where the pipe is to be laid out or picked up.

While the weight of such pipe is such that it can be loaded by two men without aid of machine, it is still heavy and unwieldy. Consequently, the work involved is very tiring and is prone to cause injury to the persons, the pipe, and the trailer. In addition, it is often difficult to find three men available for a sufficient length of time to perform this function. In any event, if the same could be performed with fewer persons, scheduling problems would be eased.

DISCLOSURE OF THE INVENTION

An object of the present invention is the provision of a device for improving the loading and unloading of elongated objects.

Another object is to provide a pipe loader which can operate with fewer persons.

A further object of the invention is the provision of a pipe loader which greatly reduces the length of time and distance through which the manual element of lifting the pipe is required.

Still another object is to provide a pipe loader which reduces the risk of personal injury, product injury and equipment injury than presently exists.

A still further object of the invention is to provide a pipe loader which substantially reduces the amount of physical labor required in loading or unloading pipe.

In a more general sense, it is an object of this invention to provide a conveyor unit having a drive at one end, an idler at the other end and a plurality of projecting carrier elements in spaced relation to each other fixedly attached to certain of the chain links. The conveyor unit is portably and removably attached near the center of one long side of a flatbed trailer with its drive end elevated slightly thereabove and its idler end slightly above ground level or whatever storage level the pipe to be conveyed is to be loaded from or unloaded to. The conveyor is driven by a motor and means are provided to vary the height and slope of the conveyor as well as to pivot the same to a parallel orientation with the trailer. By use of the conveyor, one of the two loading helpers is no longer needed, each length of pipe being substantially balanced at its center on the conveyor and substantially controlled thereupon by a single helper at one end of the pipe.

These and other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the pipe loader showing it being used to load pipe between a pile of pipe and a flatbed trailer;

FIG. 2 is a right side view of the pipe loader as it is loading pipe onto a trailer which is shown in partial view and in partial section;

FIG. 3 is a partial right side view of the pipe loader with portions thereof broken away in the area of the idler conveyor;

FIG. 4 is an enlarged cross sectional view of the pipe loader taken along line 4—4 of FIG. 2.

BEST MODE FOR CARRYING OUT THE INVENTION

Referring now to the drawings, wherein like reference numerals designate identical or corresponding parts throughout the several views, and more particularly to FIG. 1, whereon the pipe loader of the present invention is designated generally at 10, an elongated section of pipe (11) is shown being moved between storage pile (12) and flatbed trailer (13). Pipe loader (10) is comprised of generally designated conveyor (20), adjustable framework (30), loader support assembly (40) and power and control assembly (50).

Referring now to FIGS. 2, 3 and 4, whereon conveyor (20) is best seen, conveyor (20) is supported within a housing (21) of U-shaped cross-section (see FIG. 4). Idler sprocket (22) (see FIG. 3) revolves about the shank of bolt (23) (see FIG. 4) which is adjustably positioned within an elongate opening (24) on either vertical wall (21a) of housing (21). Elongate openings (24) are located near an end (21b) of housing (21) which extend away from trailer (13) as it is supported thereby in a manner to be described hereinbelow. Nut (27) (see FIG. 4) secures bolt (23) to housing (21) in a manner shown will enable idler wheel (22) to rotate freely thereabout. As seen in FIG. 4, hub (28) of idler (22) has a length slightly less than the space between the vertical walls (21a) of housing (21), thus maintaining the central location of idler (22) therewithin.

At the upper end (21c) of housing (21) and supported therewithin in a conventional fashion is drive sprocket assembly (29) (see FIG. 2). Drive sprocket assembly (29) is comprised of an axle (29a), axle bearings (29b) affixed on either side of the outside of the vertical walls (21a) of housing (21), a main drive sprocket (not shown) which is equivalent in size to idler sprocket (22) and affixed in a conventional manner to axle (29a), and secondary drive sprocket (29c) affixed on a portion of axle (29) which protrudes beyond one of the bearings (29b) a sufficient distance therefor. Plate (29f) is affixed to the vertical wall (21a) of housing (21) beyond which axle (29a) extends and supports hydraulic motor (51) of power and control assembly (50) on the side of plate (29f) distal the protruding end of axle (29a) (as best seen in FIG. 1). Drive chain (29d) transmits power from motor drive sprocket (29e), which is affixed to the drive shaft of motor (51) to secondary drive sprocket (29c). Of course, electric or other motive power could be used.

Carrier chain (26) is supported by idler sprocket (22) and the main drive sprocket affixed to axle (29a). Evenly spaced along the length of chain (26) are a plurality of pairs of tabs (26) affixed to the exposed sides of pin links (26b). Supported between and by each pair of tabs (26a) is a carrier block (26c). The face of carrier block (26c) upon which elongate objects will be supported during loading or unloading operations is parabolic in shape in order to maximize its utility in moving round objects of various diameters. As can best be seen in FIG. 3, elongate hole (24) and its counterpart, (not shown) in which axle (29a) is positioned, are both located at a position within housing (21) which enables carrier block (26c) to clear the bottom portion of housing (21) when its supporting pin link (26b) is in the slack mode and to be exposed above the top of housing (21) when its supporting pin link (26b) is in the working mode. Thus, maximum safety and simplicity of manufacture are achieved.

Adjustable framework (30) is comprised of vertical element (31) which is pivotally connected at its upper end to upper end (21c) of housing (21) and telescoping brace (32) which is pivotally connected at one end to the bottom of vertical member (31) and at its other end of extending end (21b) of housing (21). Vertical member (31) has an exterior cross section similar to and slightly lesser in dimension than the inside cross-section of sleeve (41) of loader support assembly (40). A plurality of vertically oriented holes (33) (see FIG. 1) running through the center of vertical member (31) enable the height thereof to be adjusted as desired through the removal and insertion of pin (34). Two diametrically opposed V-grooves are located in the upper end of sleeve (41) such than pin (34) and pipe loader (10) will normally extend perpendicular to the side of trailer (13). In addition, the slope of conveyor (20) can be adjusted as desired by shortening or lengthening telescopic brace (32). To lengthen brace (32), remove pin (37) from one of a plurality of holes (32a) in the smaller member (32b) of telescoping brace (32), member (32) is then slid within the larger member (32c) of telescoping brace (32) the desired distance, and pin (37) is then inserted in the appropriate hole (32a).

Referring now to FIG. 1 and FIG. 2, loader support assembly (40) is comprised of vertical sleeve (41), horizontal member (42) and cantilever member (43). Cantilever member (43) is affixed in a conventional manner normal to a side of the bed of trailer (13) at its approximate center point, assuming the length of trailer (13) and pipe (11) are substantially equal. Cantilever (43) projects a short distance horizontally from trailer (13). Horizontal member (42) has an interior cross-section similar to and slightly larger than the exterior cross-section of cantilever (43). Vertical sleeve (41) is rigidly affixed to horizontal member (42) distal cantilever (43). The distance horizontal member (42) and, hence, pipe loader (10), is from trailer (13) is adjusted by removing pin (44) from a single hole running vertically through horizontal member (42) and then relocating pin (44) within one of a plurality of vertical holes (not shown) in cantilever brace (43). Framework (30) and conveyor (20) can be pivoted to a position alongside trailer (13) during the transport mode by lifting the same a short distance, pivoting them 90° to parallel with trailer (13) and temporarily securing them thereto in an well-known manner. It should also be appreciated that the substantial portion of pipe loader (10) can be removed from trailer (13) by removing pin (44) and sliding horizontal member (42) from cantilever (43).

It should be appreciated that the combination of sleeve (41) and vertical support member (31) could be replaced by a hydraulic piston and cylinder. Likewise, telescoping brace (32) could also be replaced by a hydraulic piston and cylinder assembly, with the provision of a slide groove in wall (21a) for nut and bolt assembly (36).

Referring again to FIG. 1, power and control assembly (50) is comprised of hydraulic motor (51), quick couplers (52), pressure compensated flow control valve (53), and various hydraulic hoses (not numerically designated). As stated hereinabove, motor (51) is affixed to plate (29f). Valve (53) may be affixed to any convenient part of framework (30) and is shown in this embodiment as being affixed to the lower end of telescoping brace (32). The control valve is presumably located in the cabin of the pull tractor and the main hoses are connected to the power take-off thereof. Power and control assembly (50) is operated in a well-known manner. It should also be obvious that power and control to operate conveyor (20) could be supplied in any number of other well-known manners.

Referring once again to FIG. 1, the operation of pipe loader (10) will now be explained. First the height of end (21b) and the height of end (21c) are adjusted as explained hereinabove in accordance with whatever is considered convenient with respect to pile (12) of pipes (11) and trailer (13). The tractor driver next locates trailer (13) such that loader support assembly (40) is oriented approximately at the center of the length of pipes (11) stored in pile (12) and which are to be loaded onto trailer (13). In accomplishing this maneuver, the single helper whose primary function will be soon explained, is available near the rear or trailer (13) to direct him. Next, assuming quick couplers (52) have been appropriately connected, the tractor driver initiates movement of conveyor (20) in the counter-clockwise direction as viewed in FIG. 1 by means of the control lever located in the tractor cabin or pulling vehicle.

The helper then lifts a pipe (11) by grasping an end which is opposite the end of trailer (13) from pile (12) and moves the approximate center of the pipe (11) over the carrier block (26c) which is nearest pile (12). He then set the approximate center of the selected pipe (11) against the side of said carrier block (26c) which is parabolically curved. As that carrier block (26c) moves the selected pipe (11) upwards towards the trailer (13), the helper continues to support and direct the grasped end of the selected pipe (11) towards the appropriate end of trailer (13). As said carrier block (26c) turns about the top of idler sprocket (22), the helper lifts the grasped end of pipe (11) slightly in order to allow the opposite end thereof to gently contact the opposite end of trailer (13). In this embodiment of pipe loader (10) upper end (21c) of housing (21) is concave arcuate in shape in order to serve as a slide over which the approximate center of pipe (11) can be guided. The grasped end may then be gently lowered to permit the entire length of pipe (11) to rest upon the bed of trailer (13). This operation may be repeated, pipe by pipe, until the desired quantity of pipes (11) are transferred from pile (12) to trailer (13).

To unload trailer (13) the steps hereinabove described are reversed. It should also be understood that the unloading or retrieving of single pipes onto or from field locations is also accomplished in the same manner, except that the trailer must be pulled by the tractor from pipe section to pipe section as each is individually unloaded or retrieved. Of course, ordinarily it is unnecessary to adjust the height or slope of conveyor (20) for each pipe handled, nor is it necessary to stop conveyor (20) or swing pipe loader (10) from its projecting orientation between the handling of each pipe.

Obviously, many modifications or variations of the present invention are possible in light of the above teachings. It is therefore to be understood that, within the scope of the appended claims, the invention may be practised otherwise than as specifically described.

I claim:

1. A conveyor, for use in connection with a vehicle having a bed, for transferring elongate objects back and forth between the bed of the vehicle and a location proximal to the bed, said conveyor comprising:

(a) a housing having first and second ends (b) means for mounting said housing such that its first end is adjacent to and slightly above a side of the bed of the vehicle and its second end extends outwardly from said side of the vehicle and including means for varying the angle between the housing and the bed of the vehicle, (c) continuous conveyor means mounted within the housing between the first and second ends, said conveyor means having at least one means for carrying at least one of said elongate objects at its approximate center point from said bed to said location and from said location to said bed; and (d) conveyor power means mounted on the housing wherein said continuous conveyor means includes a roller chain and sprockets; the said carrying means is block means secured to links of the roller chain; the said housing mounting means further includes means for pivoting said housing about a vertical axis from an outwardly extended operating position to a transport position substantially parallel and adjacent to the bed of the vehicle; the said pivoting means includes: a vertical sleeve operably affixed with respect to the vehicle; a vertical framework member attached to the first end of the housing for pivoting within the sleeve; and means for supporting said framework member at varying heights with respect to the vertical sleeve, and means for adjustably and removably supporting said vertical sleeve to said bed of said vehicle, whereby the distance of the conveyor from the vehicle can be varied and the conveyor can be selectively dismounted from the vehicle, wherein the said elongate object is substantially longer than the transverse width of the conveyor means and is unstable when resting thereon; and whereby the conveyor assists an individual who controls the free end of the elongate object in moving the elongate object between the bed of the vehicle and the said location.

* * * * *